No. 689,019. Patented Dec. 17, 1901.
A. PATNODE.
WHEEL HUB.
(Application filed July 17, 1901.)
(No Model.)

Witnesses
Inventor
Adolphus Patnode
By James J. Sheehy, Attorney

UNITED STATES PATENT OFFICE.

ADOLPHUS PATNODE, OF ALPENA, MICHIGAN.

WHEEL-HUB.

SPECIFICATION forming part of Letters Patent No. 689,019, dated December 17, 1901.

Application filed July 17, 1901. Serial No. 68,686. (No model.)

*To all whom it may concern:*

Be it known that I, ADOLPHUS PATNODE, a citizen of the United States, residing at Alpena, in the county of Alpena and State of Michigan, have invented new and useful Improvements in Wheel-Hubs, of which the following is a specification.

My invention relates to improvements in wheel-hubs of the type which embody anti-friction-rollers; and it consists in a certain peculiar construction the novelty, utility, and advantages of which will be fully understood from the following description and claim when taken in conjunction with the accompanying drawings, in which—

Figure 1:
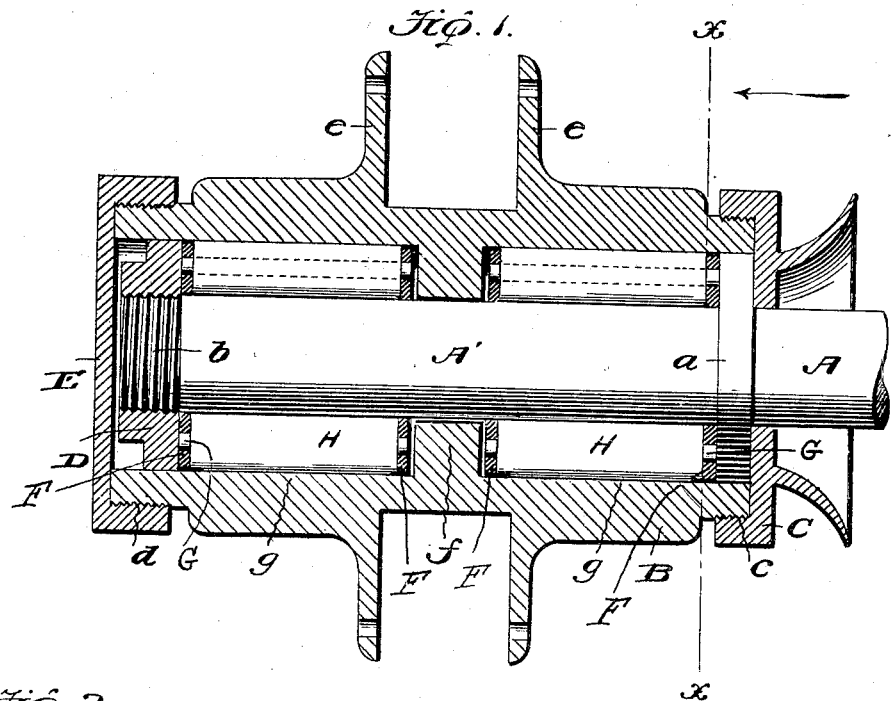
Figure 2:
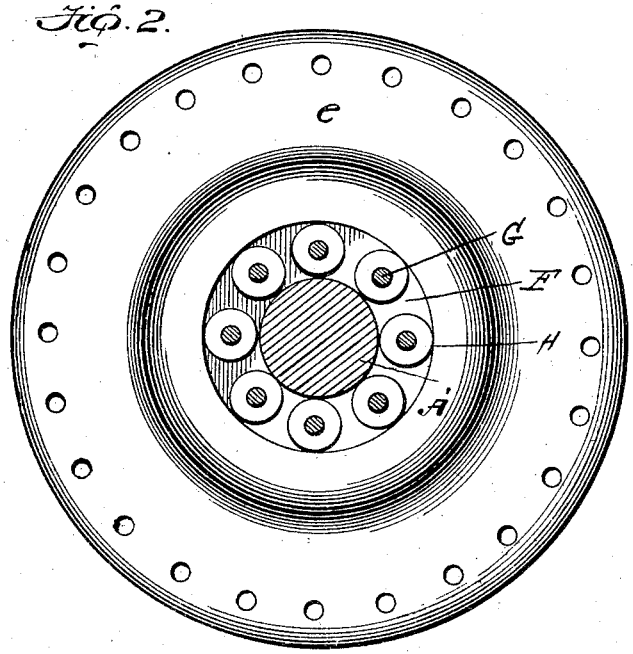
Figure 3:
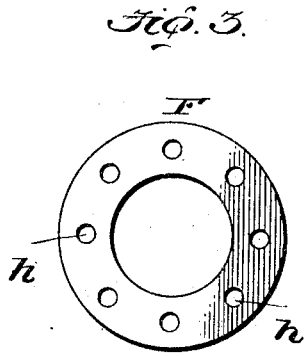

Figure 1 is a sectional view with some of the parts in elevation, illustrative of my improved hub in its proper operative position on an axle of the usual construction. Fig. 2 is a transverse section taken in the plane indicated by the line X X of Fig. 1 looking in the direction indicated by arrow, and Fig. 3 is a side elevation of one of the annular disks employed in the hub.

Similar letters of reference designate corresponding parts in all of the several views of the drawings, referring to which—

A is an axle, the spindle A' of which has the usual collar $a$ at its inner end and threads $b$ at its outer end, and B is the body of my improved hub. This body may be and preferably is cast of iron or other metal suitable to the purpose and is exteriorly threaded at its inner and outer ends, as indicated by $c$ and $d$, respectively, and provided at opposite sides of its middle with peripheral apertured flanges $e$, the latter for the connection of spokes. (Not shown.) Interiorly the body is provided with an annular flange $f$, which occupies its transverse center, and turned bores $g$, which extend from the flange $f$ to its opposite ends and are of even diameter throughout.

C is a dust-guard screwed on the inner end of body B and loosely surrounding the axle at the inner side of the collar $a$; D, a circular nut of slightly less diameter than the outer bore $g$ of the body, arranged in said bore and on the threaded end of the axle-spindle; E, a cap screwed on the outer end of the body to exclude dust from the interior thereof; and F F annular apertured disks, of which four are employed. These disks are disposed as shown—*i. e.*, two are arranged at opposite sides of the interior flange $f$ of the body, one at the outer side of the collar $a$ and one at the inner face of the nut D. Their apertures $h$ receive the ends of shafts G, which are preferably of steel, and on the said shafts are loosely mounted antifriction-rollers H, of steel or other suitable metal, which are interposed between the disks and also between the axle-spindle and the hub. The diameter of the said rollers H is slightly greater than the width of the flange $f$ and disks F, and consequently it will be seen that said flange and disks are prevented from contacting with the axle-spindle and creating friction when the hub is turned thereon.

It will be readily appreciated from the foregoing that the two circular series of rollers H, disposed at opposite sides of the flange in the hub-body, will bear and roll on the axle-spindle and afford long rolling supports for the hub-body, with the result that the wheel, of which the hub is designed to form a part, will be held in its true position, and friction incident to the rotation of the hub will be reduced to a minimum; also, that the construction of the hub as a whole is very simple and compact, and the parts are adapted to be quickly and easily assembled on the axle. It will further be appreciated that by virtue of the guard C and cap E dust is practically precluded from gaining access to the interior of the hub and causing frictional wear of the parts.

By reason of the rollers H being loosely mounted on the shafts G frictional wear is removed from the disks F, and said disks may therefore be formed of cast-iron or other comparatively cheap metal—this with a view of diminishing the cost of the hub as a whole without detracting from its durability.

The dust-guard C may be formed in sections welded together on the axle at the inner side of the collar $a$ or may be secured on the axle in any other approved manner.

Having described my invention, what I claim, and desire to secure by Letters Patent, is—

The combination of an axle-spindle having a collar at its inner end and screw-threads at its outer end, a hub-body mounted on the spindle and having an interior annular flange at an intermediate point of its length, and bores of even diameter throughout extending from said flange to its opposite ends, a nut mounted on the threaded end of the spindle, annular disks disposed in the bores of the hub-body and abutting against opposite sides of the interior flange thereof, annular disks disposed in the bores of the hub-body and abutting against the inner sides of the spindle-collar and nut, rods connecting the disks, and anti-friction-rollers mounted on said rods and interposed between the disks.

In testimony whereof I have hereunto set my hand in presence of two subscribing witnesses.

ADOLPHUS PATNODE.

Witnesses:
JOSEPH H. COBB,
MARGARET MCDONALD.